United States Patent
Bocquenet et al.

(10) Patent No.: US 6,482,297 B1
(45) Date of Patent: Nov. 19, 2002

(54) METHOD FOR DISTILLING AMMONIA

(75) Inventors: Gérald Bocquenet, Communay (FR); Patrick Houssier, Pierre-Benite (FR)

(73) Assignee: Rhodia Fiber & Resin Intermediates, Courbevoie Cedex (FR)

( * ) Notice: Subject to any disclaimer, the term of this patent is extended or adjusted under 35 U.S.C. 154(b) by 0 days.

(21) Appl. No.: 09/744,156

(22) PCT Filed: Jul. 15, 1999

(86) PCT No.: PCT/FR99/01731

§ 371 (c)(1),
(2), (4) Date: Jun. 8, 2001

(87) PCT Pub. No.: WO00/05173

PCT Pub. Date: Feb. 3, 2000

(30) Foreign Application Priority Data

Jul. 22, 1998 (FR) .............................................. 98 09530

(51) Int. Cl.$^7$ .............................. B01D 3/42; C01C 1/10; C07D 201/16
(52) U.S. Cl. ............................... 203/2; 203/24; 203/26; 203/27; 203/DIG. 8; 423/210; 540/540
(58) Field of Search ................................. 203/91, 2, 14, 203/12, 24, 26, 27, DIG. 8; 540/540; 423/210; 95/257; 62/619

(56) References Cited

U.S. PATENT DOCUMENTS

| 2,108,914 | A | * | 2/1938 | Bennett ........................ 202/51 |
| 2,519,451 | A | * | 8/1950 | Fulton .......................... 202/46 |
| 2,805,984 | A | * | 9/1957 | St. Clair ...................... 202/46 |
| 3,054,726 | A | | 9/1962 | Fields et al. |
| 3,595,615 | A | | 7/1971 | Kaparakos |
| 5,539,106 | A | * | 7/1996 | Thijert et al. ................ 540/540 |

FOREIGN PATENT DOCUMENTS

| DE | 195 48 289 | 6/1997 |
| FR | 2 526 005 | 11/1983 |
| FR | 2 755 132 | 4/1998 |

* cited by examiner

Primary Examiner—Virginia Manoharan
(74) Attorney, Agent, or Firm—Burns, Doane, Swecker & Mathis, L.L.P.

(57) ABSTRACT

The present invention relates to an improved process for distilling ammonia from a mixture, more particular from a mixture resulting from the reaction between aminonitrile and water (which reaction is also called cyclizing hydrolysis). The process for distilling the ammonia contained in an aqueous caprolactam solution, uses a column with a bottom temperature less than or equal to 160° C. and at an absolute pressure less than or equal to 5 bar, the ammonia distilled at the top of the column being compressed to a pressure greater than or equal to 10 bar and then condensed at a temperature of 25° C. to 60° C.

6 Claims, No Drawings

METHOD FOR DISTILLING AMMONIA

The present invention relates to an improved process for distilling ammonia from a mixture, more particularly from a mixture resulting from the reaction between an aminonitrile and water (this reaction also being called cyclizing hydrolysis).

During the cyclizing hydrolysis of an aminonitrile in order to form a lactam, one molecule of ammonia per molecule of lactam is also formed.

At the end of the reaction, the reaction mixture therefore contains at least the lactam produced, the excess water and ammonia.

It may contain lesser amounts of aminonitrile that has not reacted or possible by-products of the reaction.

It may also comprise a solvent possibly used in the cyclizing hydrolysis reaction.

For the description of the various processes for preparing a lactam by cyclizing hydrolysis of an aminonitrile, reference may be made, for example, to Patent EP-A-0 659 741 or to International Patent Application WO-A-96/22974 or to International Patent Applications WO-A-95/14664 and 95/14665.

The cyclizing hydrolysis may be carried out in vapor phase or in liquid phase. The process of the invention may apply to mixtures resulting from one or other of these methods of preparation.

Among the solutions resulting from the cyclizing hydrolysis of an aminonitrile into a lactam, those which correspond to the preparation of caprolactam from 6-aminocapronitrile and water are the most important from an industrial standpoint, since the said caprolactam, upon polymerization, leads to nylon-6.

The process of the invention will therefore refer more specifically to the distillation of ammonia from aqueous solutions of caprolactam, but it may also be transposed to aqueous solutions of other lactams.

When it is desired to separate the ammonia dissolved in an aqueous caprolactam solution, it is necessary to prevent degradation of the caprolactam as far as possible. This means that, during distillation, the temperature at the bottom of the column will preferably be maintained at a value less than or equal to 160° C. and more preferably less than or equal to 145° C. This constraint means that the absolute pressure must be limited to a value less than or equal to 5 bar and preferably less than or equal to 3.5 bar.

As a consequence of the above, the temperature of the ammonia leaving the top of the column is, depending on the above absolute pressure limit adopted, less than or equal to +5° C. and preferably less than or equal to −6° C.

In an industrial process, effective condensation of the ammonia at the top of the column requires a refrigeration unit of considerable power. For example, a 300 kW refrigeration unit will be needed to distil approximately 1200 kilograms/hour of ammonia.

The subject of the present invention is a process for separating, by distillation, the ammonia contained in an aqueous caprolactam solution, by maintaining the temperature of the said solution at the bottom of the column at a value less than or equal to 160° C. and preferably less than or equal to 145° C., under conditions making it possible to reduce the consumption of energy necessary, especially electricity, for the same output of distilled ammonia.

More specifically, the invention consists of a process for distilling the ammonia contained in an aqueous caprolactam solution, characterized in that the distillation is carried out using a column with a bottom temperature less than or equal to 160° C. and at an absolute pressure less than or equal to 5 bar, the ammonia distilled at the top of the column being compressed to a pressure greater than or equal to 10 bar and then condensed at a temperature of 25° C. to 60° C.

Preferably, the temperature at the bottom of the column is less than or equal to 145° C. and the absolute pressure is less than or equal to 3.5 bar.

The ammonia distilled at the top of the column is preferably compressed to a pressure of between 10 bar and 25 bar.

After condensation, the liquid ammonia obtained at a pressure of 10 to 25 bar is expanded to the pressure of the column in a liquid/vapor separator. During the expansion, the ammonia vaporizes partially and cools, and the vapor generated is sent to the top of the distillation column and then recompresssed by the compressor at the top of the column. The liquid recovered in the liquid/vapor separator is pumped and then part of it is returned to the top of the column as reflux, the other part, constituting the pure ammonia recovered, is sent off as utilizable product.

This solution does not require the presence of an external refrigeration unit to condense the distilled ammonia. The energy necessary for the compression is of the order of approximately 70% of the energy which would be consumed by the said refrigeration unit.

In addition, the investment necessary for the process is less because the way in which the streams are made to flow is simplified.

The aqueous caprolactam solution, which contains ammonia, has a caprolactam concentration and an ammonia concentration which vary widely depending on the conditions under which the caprolactam is prepared, especially the initial water/aminonitrile molar ratio and whether or not an organic solvent is present. The caprolactam concentration may generally vary from 5% to 80%, and preferably from 20% to 75%, by weight with respect to the total weight of the solution. The ammonia concentration may generally vary from 0.85% to 15%, and preferably from 3.5% to 14%, by weight with respect to the total weight of the solution.

Since the ammonia to be distilled has physical characteristics that are very different from the other compounds in the aqueous solution containing it, it is not necessary to use a column having a very large number of theoretical trays.

Packed columns having approximately ten theoretical trays are very suitable for implementing the process of the invention. However, this indicative value does not constitute an absolute limit in the context of the invention. Higher-performance columns only have, as drawback, a higher investment cost, whereas less-effective columns may nevertheless be used although not preferred.

The packing used may be of the loose packing or ordered packing type, as proposed by the various manufacturers and sized according to the rules of the art.

It is also possible to use columns with trays, although this is less advantageous from the standpoint of head losses.

The overhead vapor compressor may, depending on the applications and the treatment capacities, be of the positive-displacement compressor type such as, for example, a reciprocating compressor or screw compressor, or of the centrifugal type, without these technologies being exhaustive in respect of the aforementioned process.

The following example illustrates the invention. This example and the comparative test correspond to a caprolactam production of 8 t/h.

EXAMPLE 1

Distillation with Overhead Vapor Compression.

Distillation of a product having the following composition:

ammonia: 9% by weight water: 30% by weight caprolactam: 61% by weight.

The characteristics of the distillation column are as follows:

number of distillation stages: 10 reflux ratio: 0.30 absolute operating pressure at the top of the column: 3.5 bar top temperature: 35° C.

bottom temperature: 145° C.

heat load of the boiler: 1.1 Gcal/h absolute delivery pressure of the overhead compressor: 14 bar power consumed by the overhead compressor: 160 kW heat load of the condenser at the compressor delivery: 0.7 Gcal/h.

The caprolactam solution which was obtained after distilling off the ammonia has the following composition:

ammonia: 0.01% by weight water: 33% by weight caprolactam: 67% by weight.

Comparative Test 1

Conventional Distillation Using a Refrigeration Unit at the Top of the Column

Distillation of a product having the following composition:

ammonia: 9% by weight water: 30% by weight caprolactam: 61% by weight

The characteristics of the distillation column are as follows:

number of distillation stages: 10 reflux ratio: 0.35 absolute operating pressure at the top of the column: 3.5 bar top temperature: −9° C.

bottom temperature: 145° C.

heat load of the boiler: 1.1 Gcal/h heat load of the condenser: 0.5 Gcal/h power consumed by the refrigeration unit: 270 kW, with condensation at 35° C.

The caprolactam solution which was obtained after distilling off the ammonia has the following composition:

ammonia: 0.01% by weight water: 33% by weight caprolactam: 67% by weight.

The performance of the distillation in Example 1 is strictly identical, in terms of ammonia separation efficiency, to that in the comparative test.

The energy consumption to achieve these results is markedly less in the process according to the invention.

What is claimed is:

1. A process for separating the ammonia contained in an aqueous caprolactam solution, comprising distilling said solution using a column with a bottom temperature less than or equal to 160° C. and an absolute pressure less than or equal to 5 bar, wherein the ammonia is distilled off of the column, compressing said distilled ammonia to an absolute pressure greater than or equal to 10 bar and then condensing said ammonia at a temperature of 25° C. to 60° C.

2. The process according to claim 1, wherein the temperature at the bottom of the column is less than or equal to 145° C. and the absolute pressure is less than or equal to 3.5 bar.

3. The process according to claim 1, wherein the ammonia distilled off of the column is compressed to an absolute pressure of between 10 bar and 25 bar.

4. The process according to claim 1, wherein the pressure of the ammonia distilled off of the column is increased by means of a positive-displacement compressor or a centrifugal compressor.

5. The process according to claim 1, wherein the aqueous solution contains from 5% to 80% by weight of caprolactam with respect to the total weight of said solution and from 0.85% to 15% by weight of ammonia with respect to the total weight of said solution.

6. The process according to claim 1, wherein the aqueous solution contains from 20% to 75% by weight of caprolactam with respect to the total weight of said solution and from 3.5% to 14% by weight of ammonia with respect to the total weight of said solution.

* * * * *